(12) United States Patent
Boland

(10) Patent No.: US 11,794,698 B2
(45) Date of Patent: Oct. 24, 2023

(54) WINDSCREEN WIPER DEVICE OF THE FLAT BLADE TYPE

(71) Applicant: TRICO BELGIUM S.A., Aubange (BE)

(72) Inventor: Xavier Boland, Arlon (BE)

(73) Assignee: TRICO BELGIUM S.A, Aubange (BE)

( * ) Notice: Subject to any disclaimer, the term of this patent is extended or adjusted under 35 U.S.C. 154(b) by 0 days.

(21) Appl. No.: 17/632,489

(22) PCT Filed: Aug. 6, 2019

(86) PCT No.: PCT/EP2019/071094
§ 371 (c)(1),
(2) Date: Feb. 2, 2022

(87) PCT Pub. No.: WO2021/023373
PCT Pub. Date: Feb. 11, 2021

(65) Prior Publication Data
US 2022/0281417 A1    Sep. 8, 2022

(51) Int. Cl.
*B60S 1/38*    (2006.01)
*B60S 1/40*    (2006.01)

(52) U.S. Cl.
CPC .......... *B60S 1/3855* (2013.01); *B60S 1/3863* (2013.01); *B60S 1/4087* (2013.01); *B60S 2001/409* (2013.01)

(58) Field of Classification Search
CPC ..... B60S 1/3808; B60S 1/3867; B60S 1/3851
See application file for complete search history.

(56) References Cited

U.S. PATENT DOCUMENTS 9,346,437 B2 *   5/2016   Song ...................... B60S 1/4016
9,469,277 B2 *  10/2016   Bex ....................... B60S 1/3853
(Continued)

FOREIGN PATENT DOCUMENTS

| WO | WO-2013087109 A1 * | 6/2013 | ............ B60S 1/3808 |
| WO | WO-2014000768 A1 * | 1/2014 | ............ B60S 1/3858 |
| WO | WO-2017097353 A1 * | 6/2017 | ............ B60S 1/3851 |

OTHER PUBLICATIONS

Patent Cooperation Treaty, International Written Opinion for PCT/EP2019/071094, 6 pages, dated Feb. 8, 2022.

*Primary Examiner* — Michael D Jennings
(74) *Attorney, Agent, or Firm* — Bryan Cave Leighton Paisner LLP

(57) ABSTRACT

A windscreen wiper device of the flat blade type comprising an elastic, elongated carrier element, as well as an elongated wiper blade of a flexible material, which can be placed in abutment with a windscreen to be wiped, which wiper blade includes at least one longitudinal slit, in which slit at least one longitudinal strip of the carrier element is disposed, which windscreen wiper device comprises a connecting device for a rod-like extension of an oscillating arm, wherein said rod-like extension can be pivotally connected to said connecting device about a pivot axis near a free end thereof, wherein said connecting device comprises a first part and a second part, wherein said rod-like extension of said oscillating arm can be pivotally connected to said first part about said pivot axis, with the interposition of said second part, wherein said first part is connected to said wiper blade and said second part is detachably snapped onto said first part, with the special feature that said second part comprises a channel arranged to receive said free end of said rod-like extension, wherein said second part has a U-shaped cross-section having an inclined base and two legs extending downwardly from said base, and wherein said second part (Continued)

comprises reinforcement means to arrange that bending locations of said legs upon snapping said second part onto said first part lie in the same horizontal plane.

13 Claims, 3 Drawing Sheets

(56) References Cited

U.S. PATENT DOCUMENTS

| | | | |
|---|---|---|---|
| 9,845,078 B2 * | 12/2017 | Boland | B60S 1/40 |
| 2015/0026910 A1 * | 1/2015 | Boland | B60S 1/3887 |
| | | | 15/250.201 |
| 2019/0152445 A1 * | 5/2019 | Bencsik | B60S 1/3863 |

* cited by examiner

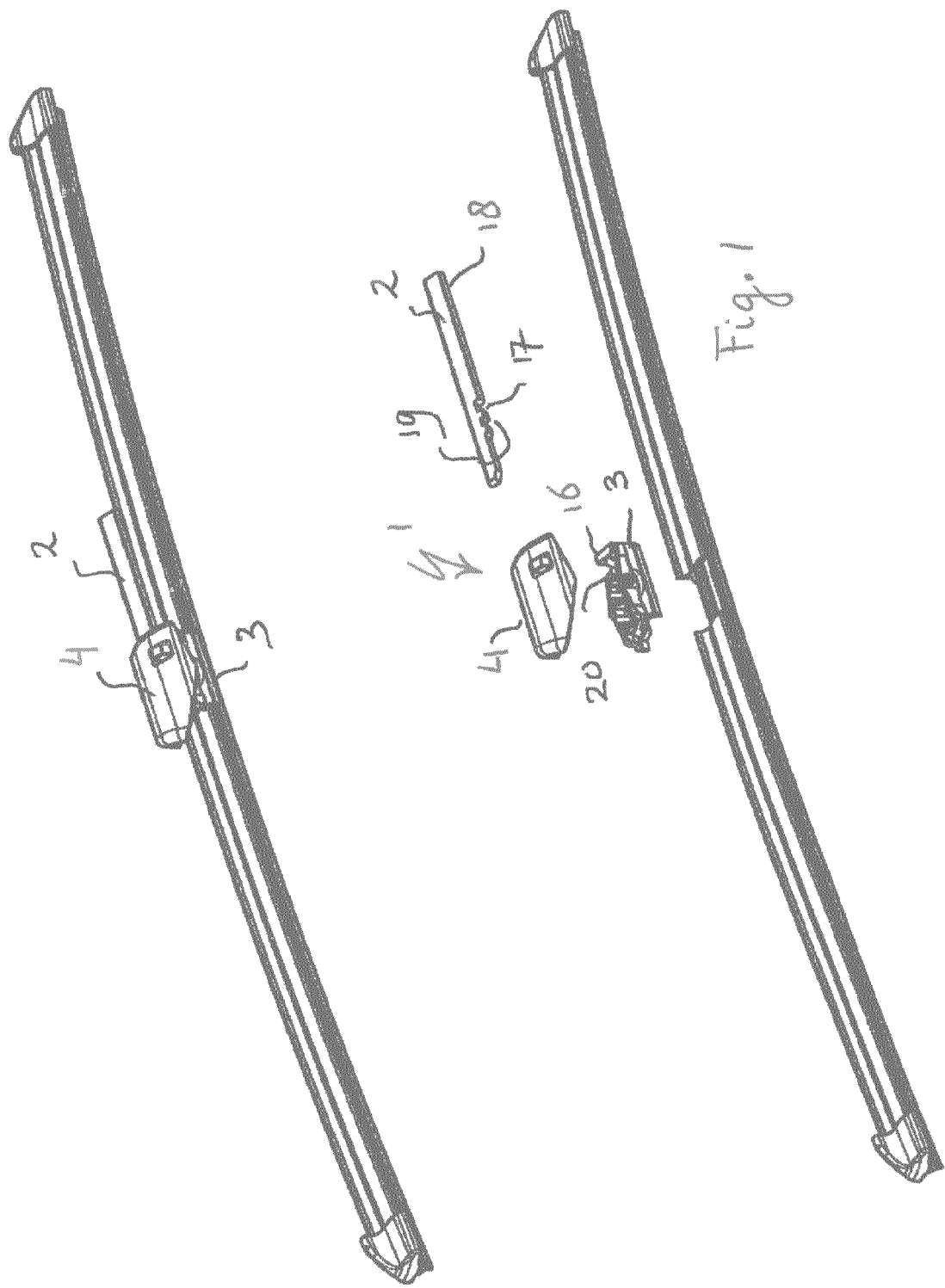

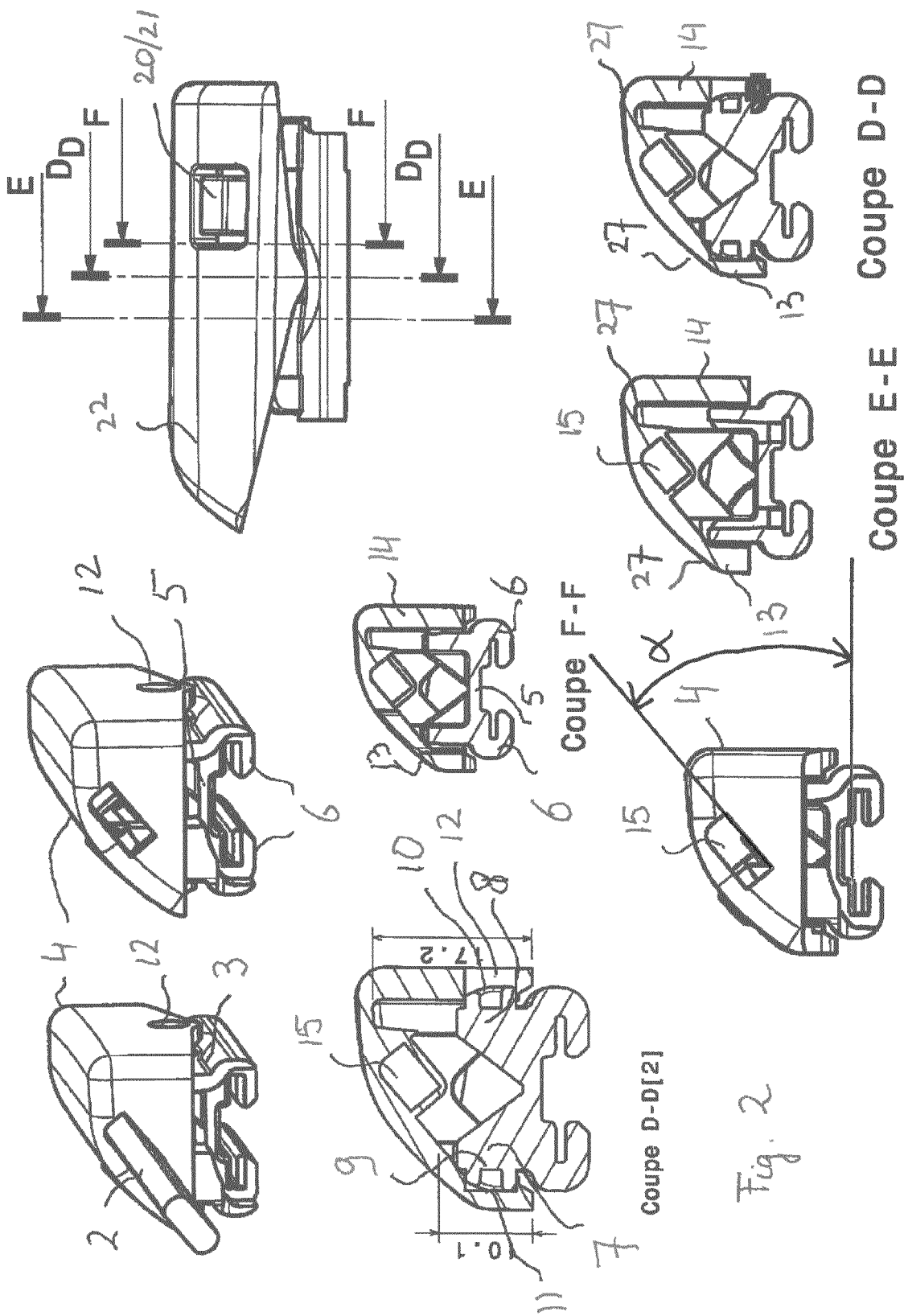

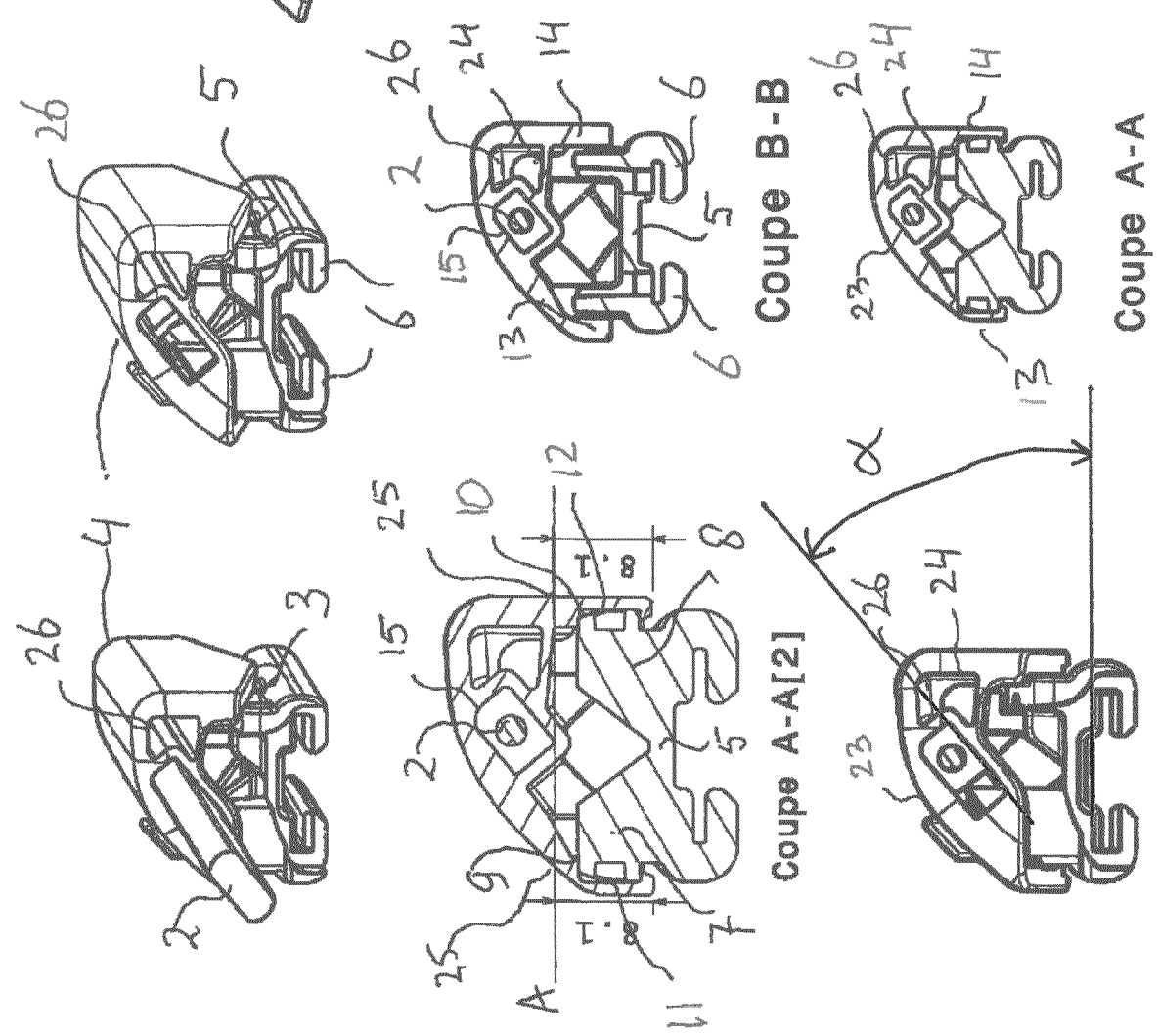

WINDSCREEN WIPER DEVICE OF THE FLAT BLADE TYPE

CROSS-REFERENCE TO RELATED APPLICATIONS

This application is a U.S. national stage entry of International Application Number PCT/EP2019/071094. International Application Number PCT/EP2019/071094 is incorporated herein by reference in its entirety.

BACKGROUND

A windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature. Tests of the known windscreen wiper device has revealed that, particularly when use is made of an inclined upper surface of the second part of the connecting device in order to achieve an air deflecting effect, a front side and a back side of this second part have mutually different geometries, leading to mutually different stresses on said front side and said back side, particularly in the event that said second part is mounted onto said first part of this connecting device. These mutually different stresses, also occurring at other occasions, such as during wiping, may lead to local damages, wear and aging of this second part, with all negative consequences involved, also regarding wiping qualities.

SUMMARY

The present invention relates to a windscreen wiper device of the flat blade type comprising an elastic, elongated carrier element, as well as an elongated wiper blade of a flexible material, which can be placed in abutment with a windscreen to be wiped, which wiper blade includes at least one longitudinal slit, in which slit at least one longitudinal strip of the carrier element is disposed, which windscreen wiper device comprises a connecting device for a rod-like extension of an oscillating arm, wherein the rod-like extension can be pivotally connected to said connecting device about a pivot axis near one end thereof, wherein said connecting device comprises a first part and a second part, wherein said rod-like extension of said oscillating arm can be pivotally connected to said first part about said pivot axis, with the interposition of said second part, wherein said first part is connected to said wiper blade and said second part is detachably connected to said first part. Said longitudinal strip is also called a "flexor", while said connecting device is also indicated as a "connector". The slit may be open or closed.

Preferably, said wiper blade comprises a spoiler at a side thereof facing away from the windscreen to be wiped. The spoiler is also called an "air deflector" and is preferably made in one piece with said wiper blade through extrusion. Said longitudinal slit is preferably a central longitudinal slit accommodating said longitudinal strip. Said connecting device is preferably fixedly connected to the longitudinal strip(s) particularly through a welding, brazing ("soldering"), gluing or clamping operation or with the help of a pin inserted through said connecting device and said longitudinal strip(s). In the alternative or in addition thereto, said connecting device is clamped onto the flexible material of the wiper blade, particularly in case the latter is equipped with a central longitudinal slit for the carrier element.

In use, said oscillating arm is connected to a mounting head mounted on a drive shaft, wherein said oscillating arm at one end thereof is pivotally connected to the mounting head by means of a pivot pin and at another end thereof is connected to said wiper blade placed in abutment with said windscreen to be wiped. In use, the shaft rotates alternately in a clockwise and in a counter-clockwise sense carrying the mounting head into rotation also, which in turn draws the oscillating arm into rotation and by means of said connecting device moves the wiper blade. Said oscillating arm can thus oscillate to-and-from between first and second reversal positions.

The present invention also relates to a connecting device arranged for use in such a windscreen wiper device.

It is noted that the present invention is not restricted to automobiles, but also refers to rail coaches and other (fast) vehicles.

It is an object of the invention to provide an improved windscreen wiper device, wherein these disadvantages are obviated, in the sense that at minimum costs—without using complex machinery and additional tools—a simple second part of the connecting device thereof is proposed to effectively clean a windscreen to be wiped, without a chance of damaging this second part.

In order to accomplish that objective, a windscreen wiper device of the type referred to in the introduction is characterized according to the invention in that said second part comprises a channel arranged to receive said free end of said rod-like extension, wherein said second part has a U-shaped cross-section having an inclined base and two legs extending downwardly from said base, and wherein said second part comprises reinforcement means to arrange that bending locations of said legs upon snapping said second part onto said first part lie in the same horizontal plane. Said inclined base or upper surface of the second part of this connecting device functions in use as an air deflector or spoiler in order to reduce the pressure distribution on a wiping lip of the wiper blade. Such a reduction leads to less wear and aging of the flexible material (i.e. elastomer material or rubber) of the wiping lip. Said reinforcement means ensure that bending locations of said legs, particularly upon snapping said second part onto said first part, lie in the same horizontal plane, so that these bending locations mutually have the same height. Hence, stresses exerted on the legs, particularly at these bending locations, for example upon snapping the second part onto the first part, are more or less the same. This results in less damage, wear and aging.

Preferably, said inclined base in use is located upstream in an upward movement of the oscillating arm.

In a preferred embodiment of a windscreen wiper device in accordance with the invention said legs have the same height and the same thickness below said horizontal plane.

In another preferred embodiment of a windscreen wiper device according to the invention said reinforcement means comprise a transverse rib locally reinforcing one of said legs. Particularly, said transverse rib defines another channel in the second part parallel to said channel arranged to receive said free end of said rod-like extension.

In another preferred embodiment of a windscreen wiper device in accordance with the invention said channel includes a first chamber facing towards an entrance of said channel, as well as a second chamber facing away from said entrance, said first chamber having a larger width than said second chamber, wherein said first chamber is arranged to receive a first part of said free end of said rod-like extension, and wherein said second chamber is arranged to receive a second part of said free end of said rod-like extension, said first part of said rod-like extension having a larger width than said second part of said rod-like extension. In other words, the free end of said rod-like extension has a cut-out in order to form the two parts therein, wherein the first part is wider than the second part. The second part forms a longitudinally extending finger to be accommodated in the correspondingly shaped second chamber of the channel. The wider first part is to be accommodated in the correspondingly shaped first chamber of the channel. Due to the cut-out there is a larger guiding surface in the connecting device to guide the rod-like extension inside said channel in a reliable yet controlled manner. Preferably, said first and second chambers of the channel have a closed circumference to enhance retention of the rod-like extension therein.

In another preferred embodiment of a windscreen wiper device according to the invention said connecting device comprises a sidewardly and inwardly extending protrusion arranged to engage into a first recess provided on a longitudinal exterior side of said rod-like extension, wherein said connecting device comprises a resilient tongue arranged to engage into a second recess provided on said longitudinal exterior side of said rod-like extension, and wherein said resilient tongue is hingeable along a hinge axis between an inward position retaining said wiper blade onto said rod-like extension and an outward position releasing said wiper blade from said rod-like extension. Particularly, said channel has a closed circumference. More in particular, said channel is formed by a hole having a closed circumference. The resilient tongue cooperating with the second recess on the one hand and the protrusion cooperating with the first recess on the other hand form first and second retention means, respectively, for retaining the wiper blade onto the oscillating arm. Said first and second retention means can be used independently from one another, i.e. the first retention means can be used without the second retention means and the second retention means can be used without the first retention means. Preferably, said first and second recesses have an open circumference and are spaced-apart in longitudinal direction.

Preferably, said channel has a length and a width, wherein a plane extending in a direction of the width of said channel and a plane extending through said longitudinal strip along a width thereof at the location of the connecting device enclose an angle $\alpha$, wherein preferably $15°<\alpha<60°$. In other words, in a transverse or cross-section of the windscreen wiper device, a centre line of the cross-sectional plane of said channel encloses the angle $\alpha$ with a symmetry axis of said longitudinal groove. Because of the angle $\alpha$ less pressure by the oscillating arm on the wiper blade is necessary to maintain high velocity wiping performances.

In the framework of the present invention said oscillating arm is equipped with said rod-like extension preferably having a rectangular cross-section, wherein said extension is to be inserted in the channel of the connecting device, and wherein said extension has a twisted orientation relative to the oscillating arm preferably having a U-shaped cross-section. Such a twisted arm extension has proven to considerably improve an air flow, to considerably reduce a height of the windscreen wiper device, whereas its design is attractive from a commercial perspective. Said channel preferably having a rectangular cross-section as well, has a possible twisted orientation corresponding to the twisted orientation of the arm extension in order to accommodate said arm extension during use. In other words, a bottom of said channel does not extend parallel to a windscreen to be wiped (when the oscillating arm in one of said reversal positions is in a central region of the windscreen to be wiped and disregarding any small curvature thereof in that region), but said bottom and said windscreen to be wiped enclose said angle $\alpha$ in that region.

It is noted that the present invention is not restricted to the use of only one longitudinal strip forming the elastic carrier element that is particularly located in a central longitudinal slit or groove of the wiper blade. Instead, said carrier element may also comprise two longitudinal strips, wherein said strips are disposed in opposite longitudinal slits/grooves of the wiper blade. Said slit(s)/groove(s) may be closed at one outer end.

In another preferred embodiment of a windscreen wiper device in accordance with the invention said first part and said second part are provided with mutually cooperating pivot means for pivotally connecting said second part to said first part. Particularly, said second part is connected to said first part by pivotally engaging protuberances of said first part, at the location of said pivot axis, in recesses provided in said second part. Said protuberances are particularly mutually spaced far apart, so as to reduce angular play and to reduce wear.

In another preferred embodiment of a windscreen wiper device according to the invention said first part comprises a flat base having legs integral therewith engaging around longitudinal sides of the wiper blade, at the location of said slit.

In another preferred embodiment of a windscreen wiper device in accordance with the invention said first part comprises two opposite side walls extending in upright direction from said flat base, said side walls of said first part being entirely located inside said second part in a working position of said wiper blade.

In another preferred embodiment of a windscreen wiper device in accordance with the invention said first and said second parts are each made in one piece of plastic material.

BRIEF DESCRIPTION OF THE DRAWINGS

The invention will now be explained in more detail with reference to figures illustrated in a drawing, wherein:

FIG. 1 is a perspective view of a windscreen wiper device according to the invention, in assembled position and in disassembled position;

FIG. 2 is a perspective view of an earlier connecting device of the Applicant for receiving a rod-like extension of an oscillating arm, as well as several cross-sectional views thereof; and FIG. 3 corresponds to FIG. 2, with the difference that it concerns a connecting device according to the invention used in a windscreen wiper device of FIG. 1.

DETAILED DESCRIPTION

FIG. 1 refers a windscreen wiper device of the flat blade type in accordance with the invention, built up of a wiper blade, in the longitudinal sides of which opposing longitudinal slits are formed, and of longitudinal strips ("flexors") made of spring band steel, which are fitted in said longitudinal slits. Said strips form a flexible carrier element for the rubber wiper blade, as it were, which is thus biased in a curved position (the curvature in operative position being that of a windscreen to be wiped). As shown in FIGS. 1, 2 and 3, the windscreen wiper device is furthermore built up of a connecting device 1 of plastic material for a rod-like extension 2 of a windscreen wiper arm. Said connecting device 1 comprises a first part 3 and a second part 4 acting as a joint part, wherein said rod-like extension 2 arm can be pivotally connected to said first part 3 about said pivot axis, with the interposition of said second part 4. With reference to FIGS. 2 and 3, said first part 3 comprises a flat base 5 having inwardly extending legs 6 integral therewith engaging around longitudinal sides of the wiper blade, at the location of said grooves, as a result of which the first part 1 is firmly attached to the unit consisting of the wiper blade and the strips. Said first part 3 comprises two opposite side walls 7, 8 extending in upright direction from said flat base 5. On said opposite side walls 7, 8 are formed cylindrical protuberances 9, 10 extending outwardly. These protuberances 9, 10 pivotally engage, at the location of said pivot axis, in identically shaped recesses 11, 12 provided in opposite walls 13, 14 of the second part 4. Hence, said second part 4 is detachably connected to said first part 3 through a snapping/clipping operation. As shown in FIGS. 2 and 3, said side walls 7, 8 of said first part 3 are entirely located inside said second part 4 in a working position of said wiper blade.

With reference to FIGS. 1 through 3 said second part 4 comprises a channel 15 arranged to receive (in a linear movement) said rod-like extension 2 of said oscillating arm. As shown, said channel 15 has a length and a width, and wherein a plane extending in a direction of the width of said channel and a plane extending through said longitudinal strip along a width thereof at the location of the connecting device enclose an angle α=30°.

One of said side walls 8 of said first part 3 comprises a protrusion 16 extending sidewards and inwards and arranged to engage into a first recess 17 having an open circumference and provided on a longitudinal exterior side 18 of said rod-like extension 2. For mounting or dismounting the connecting device 1 from the rod-like extension the second part 4 (and thus the free end of the rod-like extension 2 connected thereto), is pivoted relative to the first part 3, wherein reference is made to FIG. 1. As far as dismounting is concerned, while carrying out the pivot movement, the protrusion or cam 16 is no longer in line with the first recess 17, so that the second part 4 and the first part 3 attached thereto can be released from the rod-like extension 2 (service position). As far as mounting is concerned, while carrying out the pivot movement, the protrusion or cam 16 becomes in line with the first recess 17, so that the second part 4 and the first part 3 attached thereto is retained onto the rod-like extension 2 (working position). The mutually cooperating protrusion 16 and recess 17 act as second retention means in case first retention means, as explained below, would inadvertently fail.

The rod-like extension 2 is also provided with a second recess 19 also having an open circumference and also provided on the same longitudinal exterior side 18 of said rod-like extension 2. As shown, said first and second recesses 17, 19 have an open circumference and are spaced-apart in longitudinal direction. Said second recess 19 cooperates with a resilient tongue 20 on the second part 4 arranged to engage into a second recess 19, together acting as first retention means in this case. Said resilient tongue 20 is hingeable along a hinge axis between an inward position retaining said second part 4 (together with the first part 3 and the wiper blade attached thereon) onto said rod-like extension 2 and an outward position releasing second part 4 (together with the first part 3 and the wiper blade attached thereon) from said rod-like extension 2. Said resilient tongue is hingeable (i.e. activated and deactivated) from said inward position into said outward position by a push button 21. Said push button 21 forms a part of an outer wall 22 of said second part 4 and is located near a free end of said second part 4 facing towards said rod-like extension 2.

According to the present invention (FIG. 3) said second part 4 has a U-shaped cross-section with an inclined base 23 and legs or opposite sidewalls 13, 14. A transverse rib 24 is provided for interconnecting the downstream sidewall or leg 14 with the body of the second part 4. Said transverse rib 24 acts as reinforcement means ensuring that bending locations 25 of said legs 13, 14, particularly upon snapping said second part 4 onto said first part 3, lie in the same horizontal plane A. Thus, these bending locations 25 mutually have the same height. Hence, stresses exerted on the legs 13, 14, particularly at these bending locations 25, for example upon snapping the second part 4 onto the first part 3, are more or less the same. This results in less damage, wear and aging. As shown, the legs or sidewalls 13, 14 have the same height and the same thickness below the plane A. Said transverse rib 24 defines another internal channel 26 in the second part 4 parallel to said channel 15 arranged to receive said free end of said rod-like extension 2. This is all in contrast to the connecting device of FIG. 2, wherein the second parts has, seen in cross-section, bending locations 27 mutually differing in height and thus resulting in mutually differing stresses on the sidewalls/legs 13, 14 during wiping, mounting etcetera.

The invention is not restricted to the preferred embodiments shown in the figures, but extends also to other preferred variants within the scope of the appended claims.

The invention claimed is:

1. A windscreen wiper device of a flat blade type comprising:
   an elastic, elongated carrier element; and
   an elongated wiper blade of a flexible material, which can be placed in abutment with a windscreen to be wiped;
   wherein:
      said elongated wiper blade includes at least one longitudinal slit in which at least one longitudinal strip of the carrier element is disposed,
      said windscreen wiper device comprises a connecting device for a rod-like extension of an oscillating arm, and said rod-like extension can be pivotally connected to said connecting device about a pivot axis near a free end thereof,
      said connecting device comprises a first part and a second part, and said rod-like extension of said oscillating arm can be pivotally connected to said first part about said pivot axis with the interposition of said second part,
      said first part is connected to said elongated wiper blade and said second part is detachably snapped onto said first part,
      said second part comprises a channel arranged to receive said free end of said rod-like extension,
      said second part has a U-shaped cross-section having an inclined base and two legs extending downwardly from said base, and
      said second part comprises reinforcement means to arrange that bending locations of said legs, upon snapping said second part onto said first part, lie in the same horizontal plane.

2. The windscreen wiper device according to claim 1, wherein said legs have the same height and the same thickness below said horizontal plane.

3. The windscreen wiper device according to claim 1, wherein said reinforcement means comprise a transverse rib locally reinforcing one of said legs.

4. The windscreen wiper device according to claim 3, wherein said transverse rib defines another channel in the second part parallel to said channel arranged to receive said free end of said rod-like extension.

5. The windscreen wiper device according to claim 1, wherein said inclined base in use is located upstream in an upward movement of the oscillating arm.

6. The windscreen wiper device according to claim 1, wherein said channel includes a first chamber facing towards an entrance of said channel, as well as a second chamber facing away from said entrance, said first chamber having a larger width than said second chamber, wherein said first chamber is arranged to receive a first part of said free end of said rod-like extension, and wherein said second chamber is arranged to receive a second part of said free end of said rod-like extension, said first part of said rod-like extension having a larger width than said second part of said rod-like extension.

7. The windscreen wiper device according to claim 1, wherein said connecting device comprises a sidewardly and inwardly extending protrusion arranged to engage into a first recess provided on a longitudinal exterior side of said rod-like extension, wherein said connecting device comprises a resilient tongue arranged to engage into a second recess provided on said longitudinal exterior side of said rod-like extension, and wherein said resilient tongue is hingeable along a hinge axis between an inward position retaining said elongated wiper blade onto said rod-like extension and an outward position releasing said elongated wiper blade from said rod-like extension.

8. The windscreen wiper device according to claim 1, wherein said first channel has a length and a width, and wherein a plane extending in a direction of the width of said channel and a plane extending through said longitudinal strip along a width thereof at the location of the connecting device enclose an angle $\alpha$, wherein preferably $15° < \alpha < 60°$.

9. The windscreen wiper device according to claim 1, wherein said first part and said second part are provided with mutually cooperating pivot means for pivotally connecting said second part to said first part.

10. The windscreen wiper device according to claim 9, wherein said second part is connected to said first part by pivotally engaging protuberances of said first part, at the location of said pivot axis, in recesses provided in said second part.

11. The windscreen wiper device according to claim 1, wherein said first part comprises a flat base having legs integral therewith engaging around longitudinal sides of the elongated wiper blade, at the location of said slit.

12. The windscreen wiper device according to claim 11, wherein said first part comprises two opposite side walls extending in upright direction from said flat base, said side walls of said first part being entirely located inside said second part in a working position of said elongated wiper blade.

13. The windscreen wiper device according to claim 1, wherein said first and said second parts are each made in one piece of plastic material.

\* \* \* \* \*